May 3, 1966　　　F. M. FERNANDEZ-HEREDIA　　　3,249,066
ACTUATING DEVICE FOR COMBINED WHEEL GUIDANCE AND
AXLE ORIENTATION IN RAILROAD VEHICLES
Filed Aug. 26, 1963　　　　　　　　　　　　5 Sheets-Sheet 2
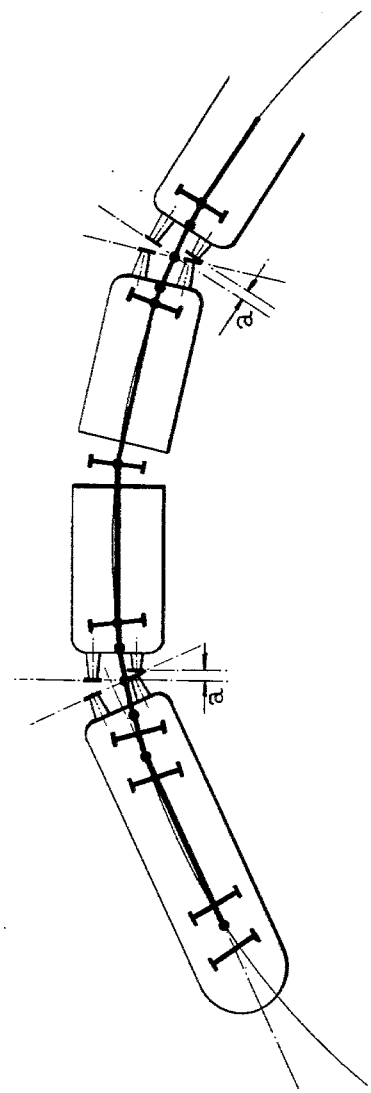
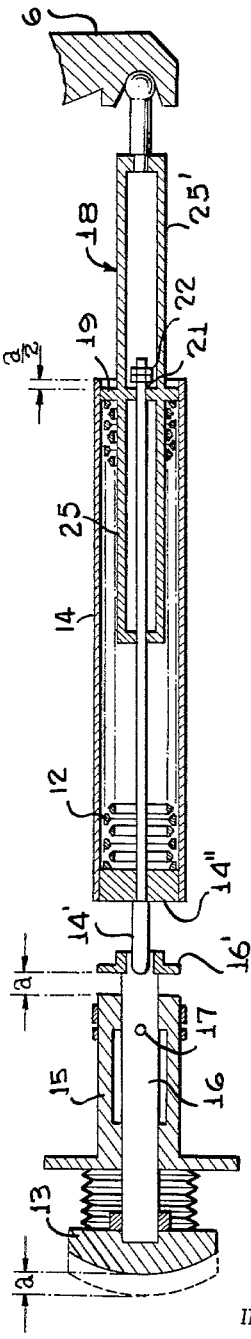
INVENTOR
Francisco Martin Fernandez-Heredia
BY
ATTORNEYS

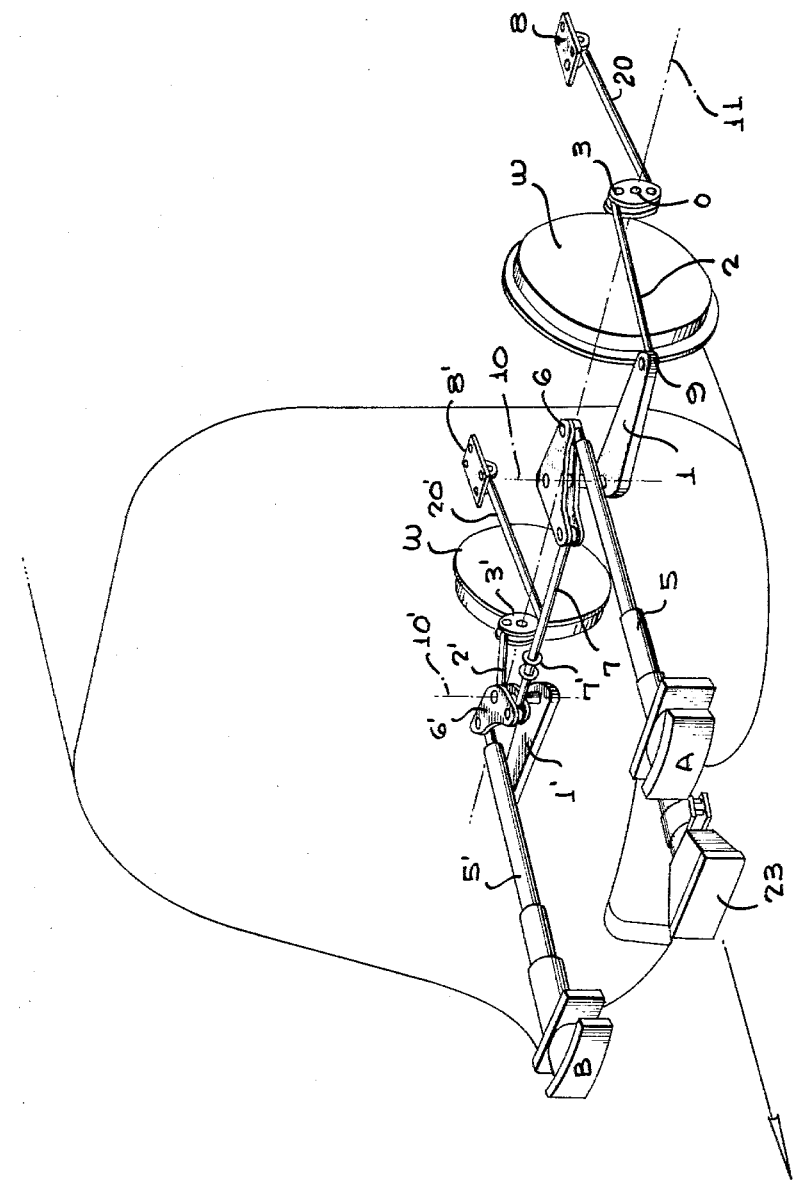

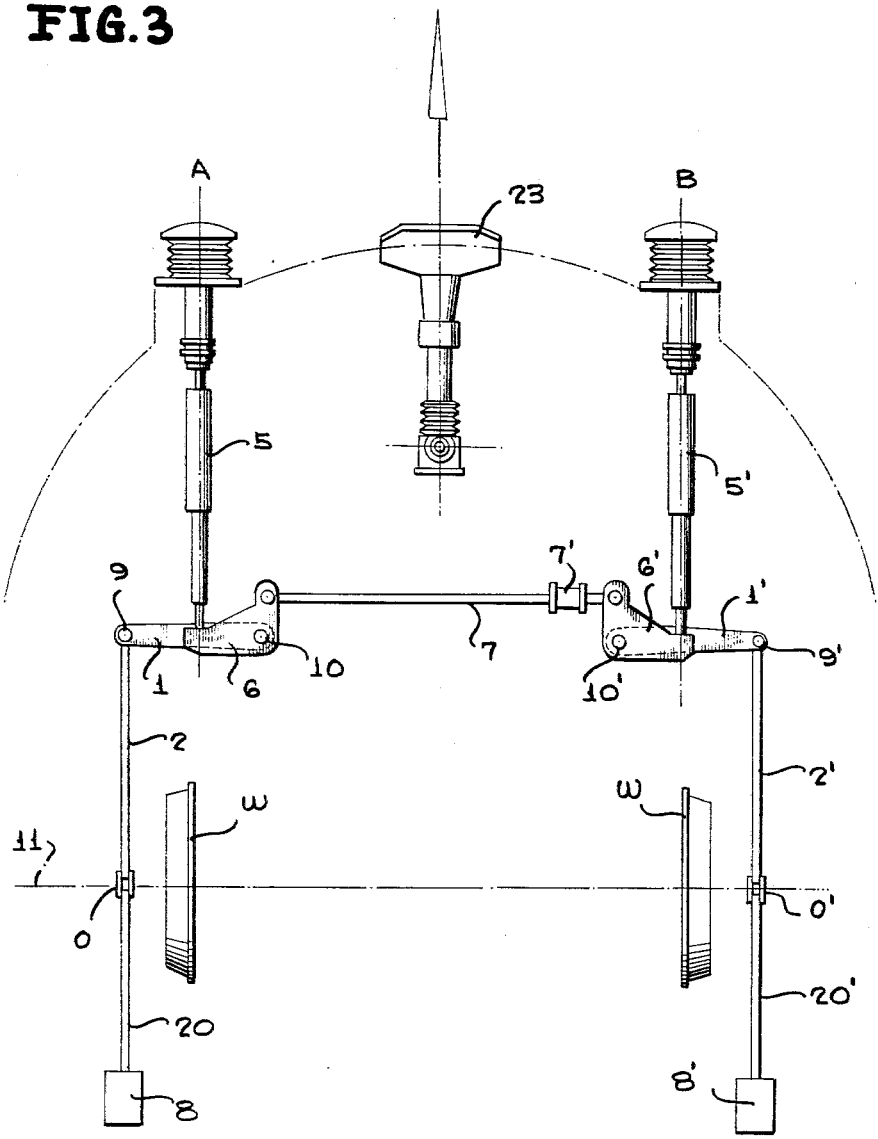

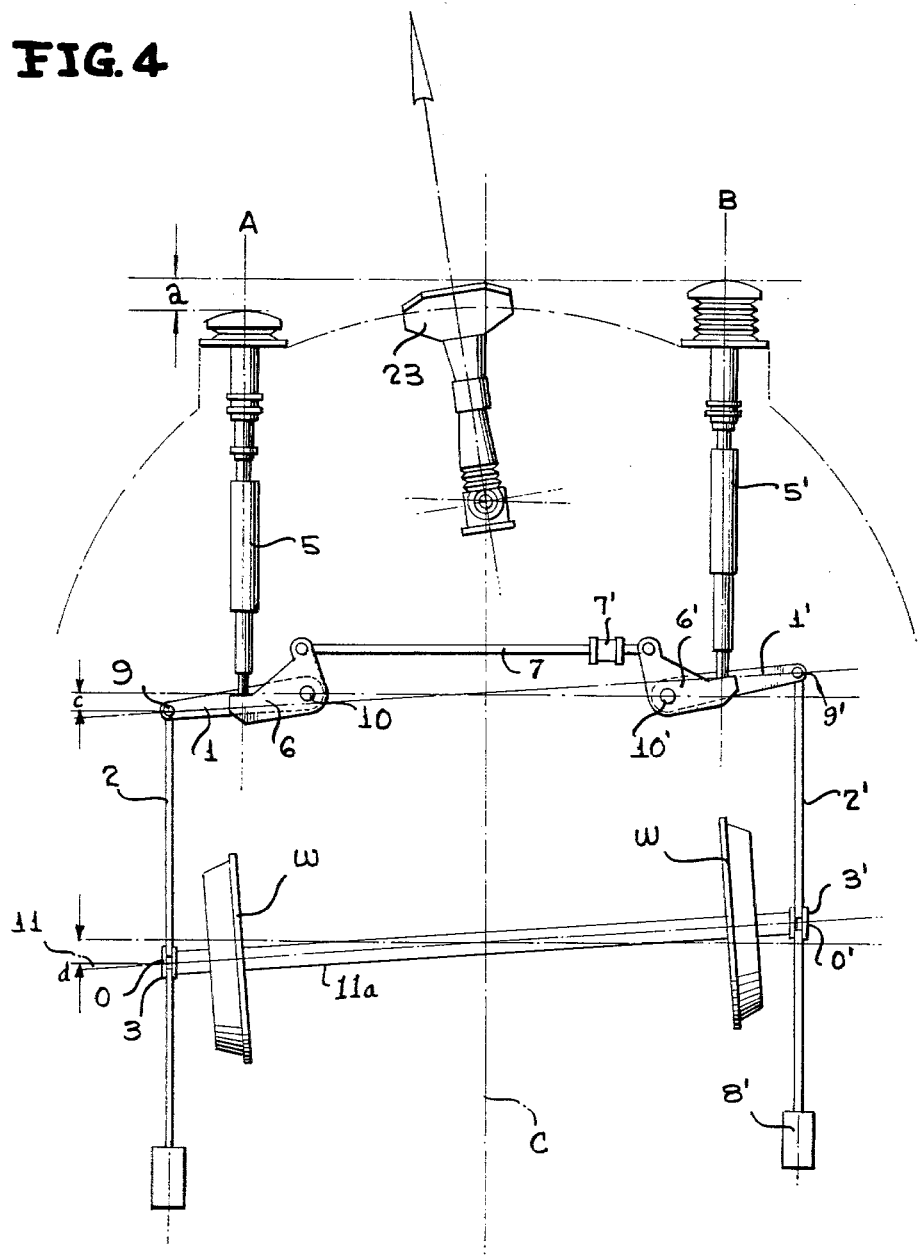

May 3, 1966 F. M. FERNANDEZ-HEREDIA 3,249,066
ACTUATING DEVICE FOR COMBINED WHEEL GUIDANCE AND
AXLE ORIENTATION IN RAILROAD VEHICLES
Filed Aug. 26, 1963 5 Sheets-Sheet 6

*INVENTOR*
Francisco Martin Fernandez-Heredia

BY *Stevens, Davis, Miller & Mosher*
ATTORNEYS

United States Patent Office 3,249,066
Patented May 3, 1966

3,249,066
ACTUATING DEVICE FOR COMBINED WHEEL GUIDANCE AND AXLE ORIENTATION IN RAILROAD VEHICLES
Francisco Martin Fernandez-Heredia, Madrid, Spain, assignor to Patentes Talgo S.A., Vitoria, Spain, a corporation of Spain
Filed Aug. 26, 1963, Ser. No. 304,572
Claims priority, application Spain, Sept. 18, 1962, 280,890
12 Claims. (Cl. 105—3)

This invention relates to an actuating device for combined wheel guidance and axle orientation in railroad vehicles.

Devices for wheel or axle orientation so far used or suggested have comprised connections between the axle to be orientated and two adjacent pivoted railroad vehicles to control the axle location according to changes in the vehicle axis angle due to variations in curvature of the tracks on which the vehicle wheels run. The use of this orientation device has introduced serious difficulties during coupling or uncoupling of two vehicles provided with guided wheels, since it has been necessary to provide means for engaging and releasing the traction and orientation connections between the two vehicles. The difficulties are especially great when each of the vehicles to be coupled and detached has near its end adjacent to another vehicle a running gear device which must be orientated.

This invention overcomes these difficulties and provides a vehicle coupling and a wheel orientation system which meets the requirements on detachment of vehicles of pivoted wheel composition for railroad operation.

The present invention solves the problem by means of a simple device on the basis of separation of the coupling function for traction or compression performed with the aid of a central mechanism, from that of guidance, obtained by the action of two side bumpers, as hereinafter described.

Thus, the coupling between vehicles or between a vehicle and a locomotive is made in a rapid and simple way without need of any special apparatus or device, at any point of the railroad network so that the coupled or detached elements are always in working order.

It should be noted that the invention does not relate to the guidance device but to the actuating device for the guidance device and although in this specification and drawings reference is made to the zero angle guidance, covered by Patent Nos. 2,746,398 and 2,746,399, it could also be adapted to another guidance device, as well as that of a guidance device of negative angle corresponding to that of Patent No. 2,687,099.

The invention will now be described by way of example with reference to the accompanying drawings, in which:

FIGURE 1 is a perspective view of an end of a railroad vehicle on which the actuating device is mounted, FIGURE 2 shows diagrammatically the locomotive and the elements of a separable composition on a curved track, FIGURE 3 is a plan view of the actuating device on a straight track, FIGURE 4 shows the same device on a curved track, and FIGURE 5 is a sectional plan view of the bumper.

Figure 6:
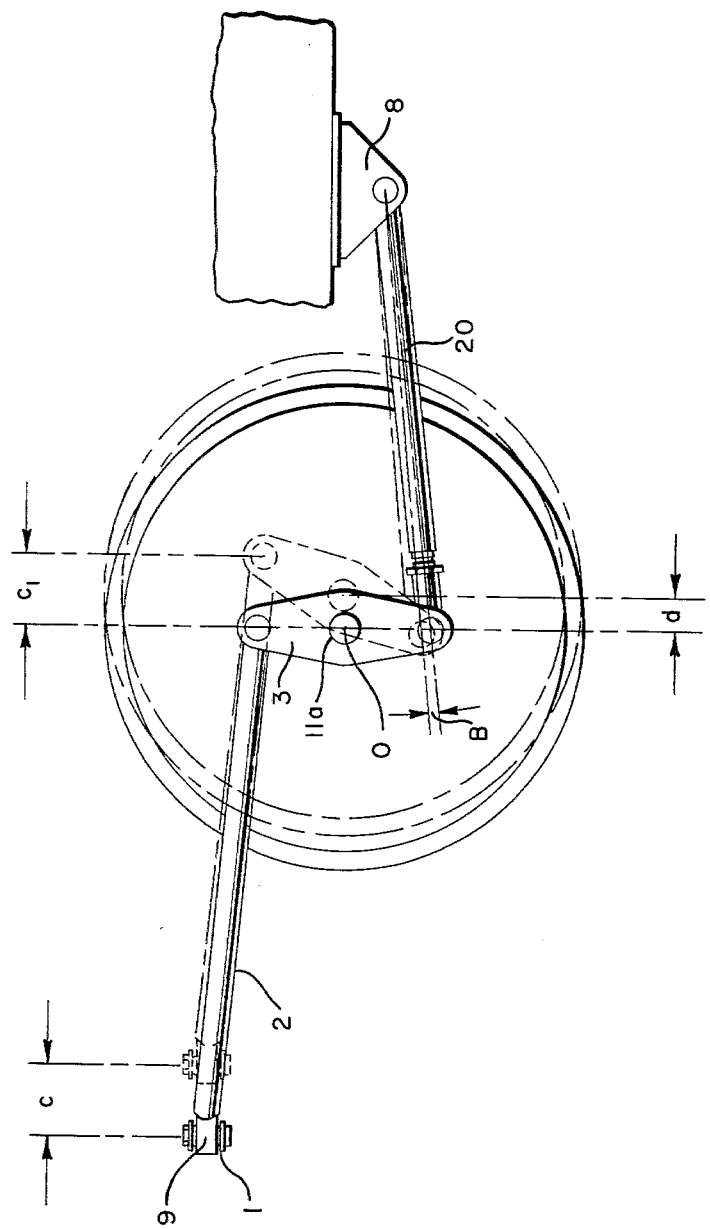
FIGURE 6 is a side elevation showing the rod and rocker arrangement.

As shown in FIGS. 1, 3 and 4, bumpers A and B are mounted on at least one end of a railroad vehicle. Each bumper A, B has one end of a rod 5, 5' connected thereto while the other end is in engagement with a bell-crank lever 6, 6' which is pivotally mounted on a pivot pin 10, 10'. Each bell-crank lever has an arm 1, 1' integral therewith which is pivotally connected at 9,9' to one end of a rod 2, 2'. The other end of each rod 2, 2' is pivotally connected to a rocker member 3, 3'.

Another rod 20, 20' is pivotally connected between rocker member 3, 3' and bracket 8, 8' fixedly mounted on the vehicle body. Numeral 11 shows the angular displacement of the axis of the wheels in a longitudinal plane contrary to a clockwise movement.

The bell-crank levers 6, 6' are also interconnected by a rod 7 whose ends are pivotally connected to each bell-crank lever.

Numeral 11a identifies the axle of the wheels. Axle 11a extends through wheel W and forms the pivot point for rocker 3.

While the foregoing arrangement has been described with respect to one end of the vehicle, it is to be understood that the same arrangement can be applied at the other end of the vehicle.

Each rod 5, 5' has the form shown in FIG. 5. A plate 13 constituting the bumper is mounted on one end of rod 16 which is movably mounted in a guidance collar 15 disposed on the vehicle body. The other end of rod 16 has mounted thereon an abutting member 16' which when the bumper is in its normal position abuts against collar 15 to limit the outward movement of bumper 13.

A tubular member 14 has one end connected by one end of rod 14' to the other end of rod 16. Another tubular member 18 is telescopically mounted within tubular member 14 and has an engaging member 19 which has a diameter substantially the same as the inner diameter of tubular member 14 thereby engaging and guiding tubular member 18 within tubular member 14.

An inner portion 25 of tubular member 18 which has a smaller diameter than that of engaging member 19 extends into tubular member 14. Apertures 21 are provided in the inner end of portion 25 and engaging member 19 so that rod 14' extends therethrough and is secured to tubular member 18 on the outer side of engaging member 19 by lock nuts 22 threadedly screwed thereon. The tubular member has an outer portion 25' engaging bell-crank lever 6.

Disposed on the inside of tubular member 14 and surrounding rod 14' and inner portion 25 is a spring 12 which is precompressed before being inserted in place and extends between end 14" of tubular member 14 and the inner side of engaging member 19.

Locking means are provided for the bumpers which comprise a pin 17 which is inserted in apertures in rod 16 and collar 15 to lock these two elements together and thereby render the rods 5, 5' inoperative.

Adjusting means 7' are mounted on interconnecting rod 7 which can be composed of any conventional elements such as a screw threadly engaging within each segment of rod 7 and lock nuts to lock both with respect to each other. The adjusting means is provided to maintain levers 6, 6' in proper alignment.

A conventional coupling element 23 is provided on the vehicle to couple two vehicles together and is located on the longitudinal axis C.

The operation of the device is as follows:

When entering a curved track, for example toward the left according to FIGURES 3 and 4, the bumper A is caused to move by the corresponding bumper of the preceding unit.

The longitudinal movement of the bumper A is transmitted through rod 5 to a bell-crank lever 6 causing the lever to rotate around pivot pin 10 together with arm 1 integral therewith, this rotation being transformed into a substantially longitudinal movement to rod 2 about pivot 9, which is the means actuating the guidance device. In the particular case shown in the drawings, which is that corresponding to Patent Nos. 2,746,398 and 2,-

746,399, since the bracket 8 is fixed to the vehicle body rocker 3, when being moved by rod 2, will rotate around a common articulation with rod 20, causing point 0 to be longitudinally displaced. Rod 20 is only subjected to a small angle movement around the articulation of bracket 8 due to a change in projection on the vertical of rocker 3.

As more specifically shown by FIGURES 4 and 6, pivoting point 9 due to a turning of arm 1, moves longitudinally an amount C. Rod 2 causes the upper pivoting point of rocker 3 to be horizontally displaced an amount $C_1$. This displacement of C and $C_1$ being substantially equal. On its movement, rocker 3, turning on pivoting point 0, causes a displacement of said point 0 in a horizontal line, as shown by d in FIGURES 4 and 6. This displacement determining on one hand the position of axle 11a. On the other hand, rod 20 is shown having one end pivotally connected to lower pivoting point of rocker 3 and the opposite end to a bracket 8 fixed to the vehicle body. Accordingly, the above described movement of rocker 3 causes said rod 20, as a result of said tilting of the rocker, to be slightly displaced as shown in B in FIGURE 6. Evidently, movement d of point 0 is proportional to movement C and $C_1$ above described.

Because of the foregoing, the distance moved by displacement of the wheel axis (shown by d) is always smaller than the distance indicated by lines joining points 9–9' (shown by C and $C_1$).

At the same time, through the action of rod 7 a rotation around pivot pin 10' of bell-crank lever 6' takes place and hence also of arm 1', the rod 2' is longitudinally moved together with the point 0' which is also in the actual running gear axis 11. Thus a counter-clockwise rotation of this axis on the horizontal plane is obtained in order to orient the axle as desired, either with negative angle or zero angle, that is with the axle tending to move towards the inner rail of the curved track or to remain in a radial position.

In a curved track toward the right the whole system operates the same way but with all movements taking place in the reverse direction.

The movement of the bumper A is linearly proportional to the curved radius as well as that required for a proper guidance at the point 0, so that when a suitable relationship of the rods 5, 5' for a given curve radius has been established, the relation is valid for any other radius.

The yielding operation of the system, according to FIGURES 4 and 5, is as follows:

The springs 12 of the bumpers, which are of the ring type, are precompressed so that their precompression force is higher than the longitudinal efforts produced in normal rolling operation, thereby avoiding guidance errors. Both springs, one for each bumper, work in series connected by the compensation device when the action is only upon one bumper (in the case of guidance in a curved track) and in parallel when the action is on both bumpers simultaneously (case of sudden coupling).

When entering a curve, the bumper A placed at the inner side of the curve is moved an amount "a" which depends on the curve radius, which movement is imparted to tubular member 14. This movement is taken up by the two springs, so that each of them will be compressed by an amount $a/2$ which will also be the movement imposed on the lever 6 in a longitudinal direction. According to this movement the levers 6, 6' and the rocker members 3, 3' are calculated to obtain the suitable guidance.

In a detached position, when the bumpers are of the trailing vehicle, those should remain blocked in relation to the structure in order that the running gear will be guided with a negative angle. This effect is automatically accomplished due to the bumper spring precompression.

When on a very long radius curve, the bumpers hardly move. No matter how slight the bumper movement may be, however, the spring precompression is lost and, therefore, the favorable effect of 100 percent of this precompression with regard to the longitudinal efforts arising from moving which are transmitted through the rods 2, 2'. These efforts, mainly those produced by a blocked wheel, give rise to a nonstabilizing torque in the levers 6, 6' which must be balanced by the bumper springs. It is to be borne in mind that the stabilizing torque is obtained through a difference in the forces corresponding to both springs. The force of one of the springs acts against this torque and that of the other spring favors it.

If the springs were helical and of low characterisitcs, a great difference in lengths would be reached which would produce an unacceptable guidance error. If on the other hand the characteristics are increased to limit the guidance error to the highest permissible value in practice, considerable forces will be introduced in the structure.

This is why helical springs are prohibitive and the use thereof is practically unrealizable, though theoretically it meets all characteristics required.

The ring springs used in the present invention have as a main characteristic a great friction energy receiving capacity, so that they only return about ⅓ of the whole force applied thereto. The main characteristic of spring 12 is that when stretched it returns only a portion, for example 30%, of the energy previously employed to compress it, the remainder of the energy being spent in the friction produced between the various rings forming the spring when this undergoes a deflection.

In the above-mentioned case of a very long radius curve, the precompression no longer exists and the stabilizing torque must be provided by the forces of the springs. As the springs opposed to the nonstabilizing torque tends to be compressed, it opposes a force corresponding to its full characteristic of compression K.

The other spring whose force favors the nonstabilizing torque, tends to be stretched, its deflection changing only when its precompression force has dropped to a ⅓ of its value, the decompression characteristic being then $K/3$. Even if an equal distortion D takes place in both springs, therefore, merely by the fact that one of them tends to be stretched and the other compressed there is a force $$F = \frac{2}{3}DK$$

to produce the stabilizing torque, which force would be null in case of helical springs.

Thus, by combining a suitable precompression force the guidance errors may be made negligible which is an important feature of the present invention.

As can be discerned from the foregoing, there has been disclosed an actuating device for a guidance device of a railroad vehicle. Changes in construction will occur to those skilled in the art and various apparently different modifications and embodiments may be made without departing from the scope of the invention which is intended to be defined in the following claims.

What is claimed is:

1. Actuating device for combined guidance of wheel and axle orientation of a railroad vehicle on a railroad track comprising bumper means on at least one end of a vehicle, said bumper means sliding axially and in parallel orientation to the longitudinal axis of the vehicle, rod means connected to said bumper means, lever means connected to said rod means and including an arm integral therewith, said lever means being pivotally connected to said vehicle, orienting means connected between said arm on the lever means and said vehicle engaging an axle to orient said axle and wheel in accordance with the alignment of the track, and moving means operatively included with said first rod means to cause said lever means and orienting means to move said axle in accordance with the curvature of the track and to compensate for the movement of said bumper means during coupling of the vehicle.

2. An actuating device for combined guidance of wheel and axle orientation of a railroad vehicle on a railroad track comprising bumper means on at least one end of a vehicle, said bumper means sliding axially and in parallel orientation to the longitudinal axis of the vehicle, rod means connected to said bumper means, lever means connected to said rod means and including an arm integral therewith, said lever means being pivotally connected to said vehicle, said rod means including a first tubular member having one end connected to said bumper means, a second tubular member telescopically mounted within said first tubular member and having one end connected to said lever means, orienting means connected between said arm on said lever means and said vehicle engaging an axle to orient said axle and wheel in accordance with the alignment of the track, spring means operatively included with said rod means, disposed within said first tubular means, and surrounding said second tubular means and extending therebetween.

3. An actuating device according to claim 2 wherein said spring means is a ring spring which is mounted between said tubular members in a precompressed condition.

4. An actuating device according to claim 2 wherein means are provided on said bumper means to prevent any outward movement thereof beyond a predetermined position.

5. An actuating device according to claim 2 wherein locking means are provided between said bumper means and said vehicle to maintain said bumper means in a locked position.

6. An actuating device according to claim 2 wherein said lever means are in pairs, spaced in symmetry, and include fourth rod means operatively interconnecting said pair of lever means.

7. An actuating device according to claim 6 wherein said interconnecting rod means includes an adjusting means to adjust the alignment of said lever means.

8. In a railroad vehicle having axle means and wheels to be oriented in accordance with the alignment of a railroad track, rocker means connected to said axle means, first rod means connected between said vehicle and said rocker means, second rod means connected between said rocker means and lever means pivotally connected to said vehicle, bumper means mounted on said vehicle, third rod means connected between said bumper means and said lever means, and spring means connected to said third rod means to enable said rod means to actuate the other rod means to move said axle means in accordance with the alignment of the track, and to compensate for non-actuation of said rod means when the vehicle is being coupled to another vehicle.

9. In a railroad vehicle according to claim 8 wherein said spring means is a ring spring which is precompressed when connected to said fourth rod means.

10. In a railroad vehicle according to claim 8 wherein locking means are provided between said bumper means and said vehicle to lock said bumper means in a nonoperative position.

11. In a railroad vehicle according to claim 8 wherein adjusting means are mounted on said third rod means to adjust the alignment of said lever means.

12. A vehicle according to claim 8 wherein said lever means are in pairs, spaced in symmetry, and including fourth rod means operatively interconnecting said pair of lever means.

References Cited by the Examiner
UNITED STATES PATENTS

| 2,908,229 | 10/1959 | Furrer | 105—3 |
| 2,936,720 | 5/1960 | VanAlstine | 105—4 |
| 2,956,515 | 10/1960 | Lich | 105—4 |

ARTHUR L. LA POINT, *Primary Examiner.*

MILTON BUCHLER, *Examiner.*

B. FAUST, *Assistant Examiner.*